United States Patent [19]

Phaneuf et al.

[11] Patent Number: 5,765,842
[45] Date of Patent: Jun. 16, 1998

[54] MEDICAL EMERGENCY TREATMENT CART

[76] Inventors: Simon Phaneuf, 541 Des Alouettes, Longueuil, Quebec, Canada, J4G 2N3; Stephane Tetreault, 374 Dejumonville, Boucherville, Quebec, Canada, J4B 1K2

[21] Appl. No.: 685,524

[22] Filed: Jul. 24, 1996

[51] Int. Cl.⁶ .................................................. B62B 3/02
[52] U.S. Cl. ............................. 280/47.35; 280/43.17
[58] Field of Search .......................... 280/47.35, 47.34, 280/79.5, 79.2, 43, 43.17; 211/13, 71, 78; 248/311.2; 312/326, 329, 330.1; 108/143

[56] References Cited

U.S. PATENT DOCUMENTS

| | | | |
|---|---|---|---|
| 3,853,329 | 12/1974 | McDonald | 280/47.35 |
| 3,877,744 | 4/1975 | Miller | 280/47.35 |
| 4,980,555 | 12/1990 | Andreen | 280/47.35 |
| 5,078,414 | 1/1992 | Laurt et al. | 280/47.35 |
| 5,290,058 | 3/1994 | Adams et al. | 108/143 |
| 5,351,976 | 10/1994 | Penson | 280/47.35 |

*Primary Examiner*—Richard M. Camby

[57] ABSTRACT

There is provided a medical emergency treatment cart which is of a generally rectangular configuration and has a pair of opposed sides and a pair of opposed ends, the cart having first and second modules at opposed ends of the cart. The first module may be classed as an airway module and includes means for storing an oxygen container and a plurality of storage drawers; a second module may be classified as a nursing station and has at least one storage drawer moveable into and out of a storage position and which is also mounted so as to be rotatable whereby access to the drawer may be had from a side or an end of the cart. An upper surface has turntable means for receiving a monitor and also includes a medicament storage compartment. The cart provides ergonomic access for all members of medical emergency treatment team responding to emergencies such as cardiac arrest.

14 Claims, 7 Drawing Sheets

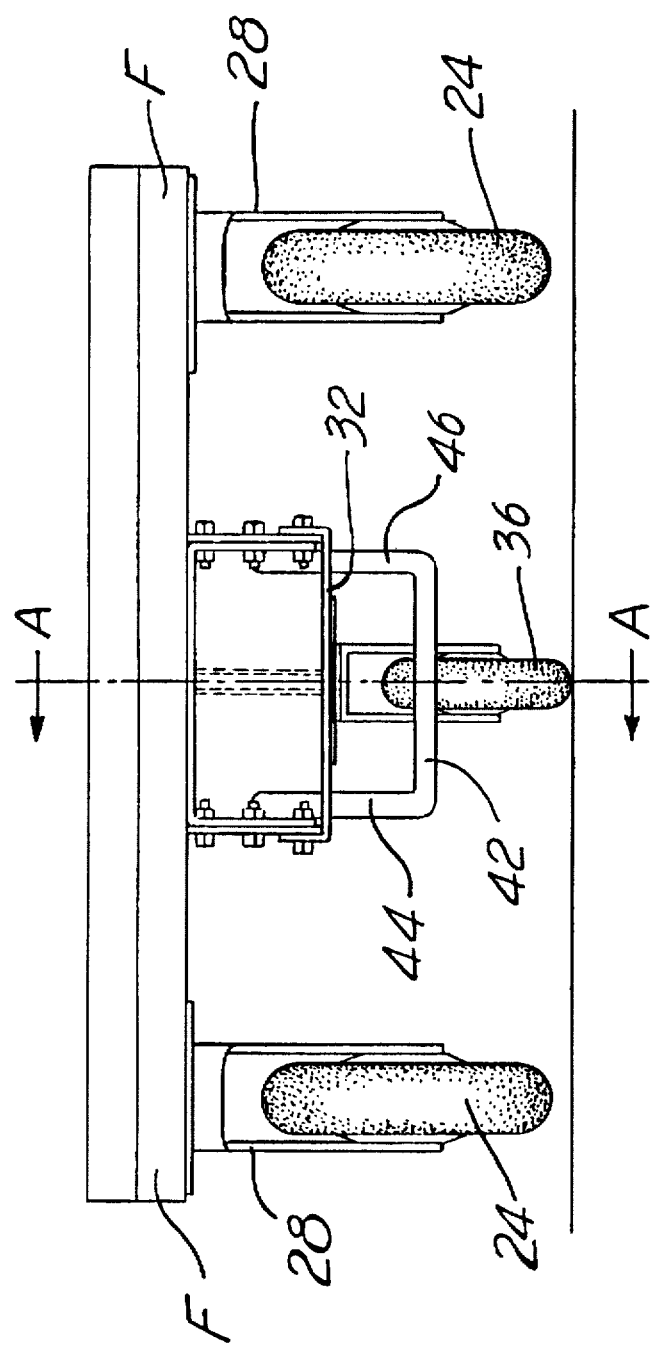

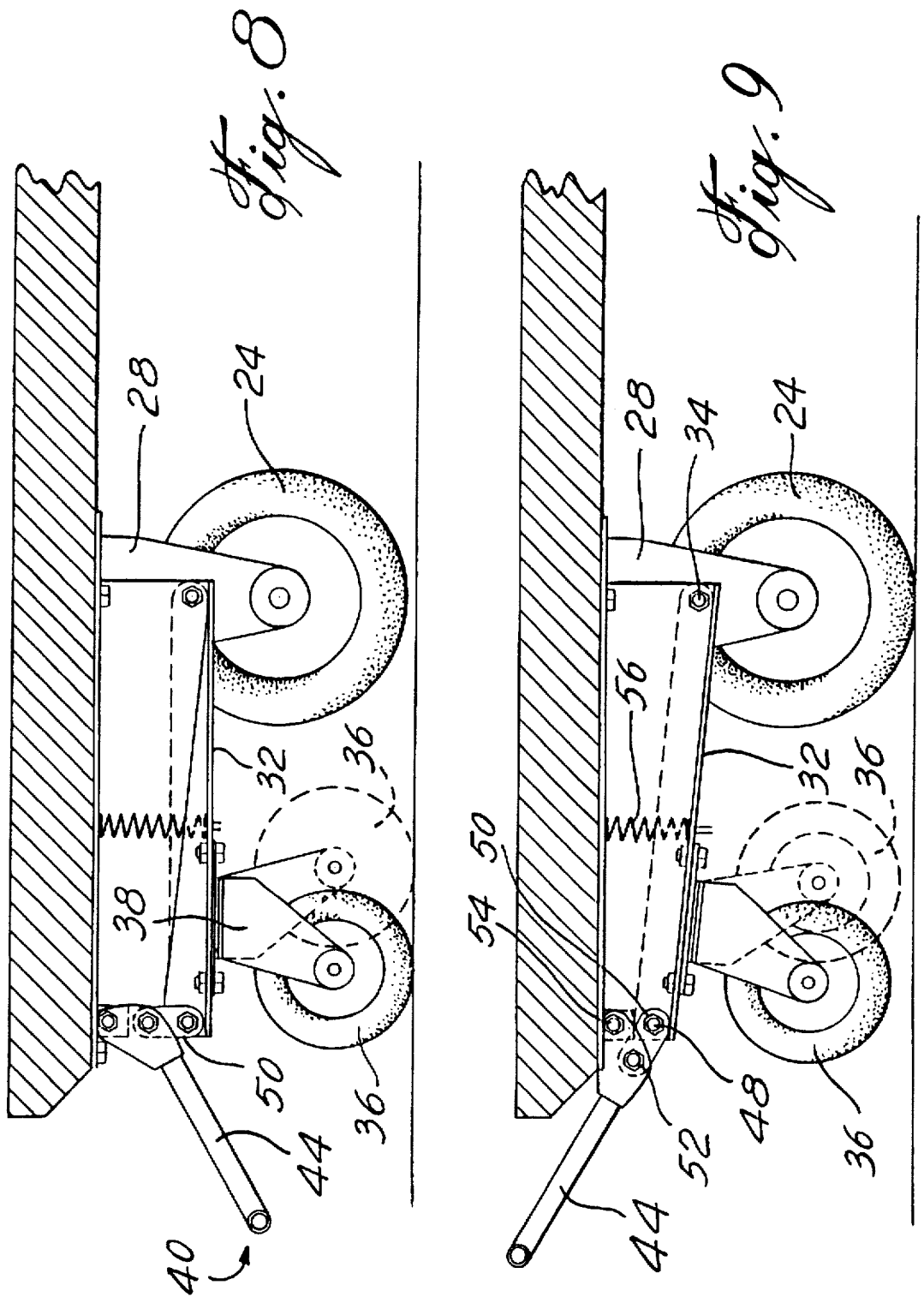

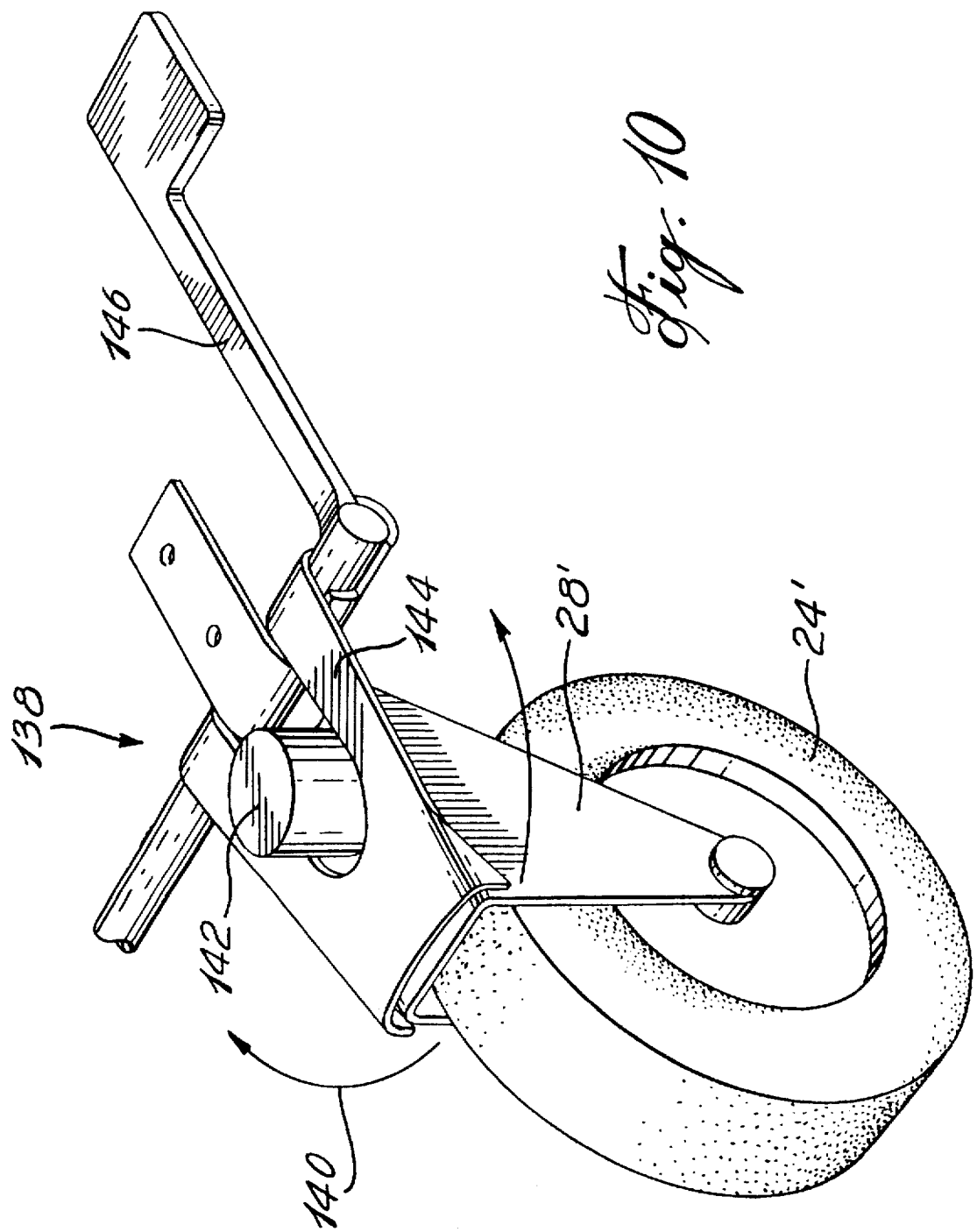

MEDICAL EMERGENCY TREATMENT CART

The present invention relates to a medical emergency treatment cart commonly known as "crash carts".

Medical emergency treatment carts or "crash carts" are widely used in hospitals and like environments for responding to medical emergencies. As such, the crash carts commonly contain a supply of medical equipment including instruments and supplies for various types of medical procedures. One of the most common uses of such crash carts is in response to cardiac arrest.

Typically, these crash carts remain stocked in a central location and when an emergency occurs, they must be moved from the storage location to the place of emergency. As such, the crash carts are usually wheeled so that they may be moved rapidly.

As aforementioned, the carts are stocked with the suitable instruments and medication required for responding to a variety of situations. The medications stored in the medical emergency treatment carts will normally include potent drugs and security is thus a factor with respect to their storage.

A problem which has occurred with many prior art carts is their lack of adaptability for a number of different situations. The cart must be constructed such that it can be moved rapidly at high speeds to the location of the emergency while providing maximum maneuverability.

Also, the carts must provide ergonomic access for all members of the treatment team. As such, the treatment team will usually include a team having a number of medical professionals.

It is an object of the present invention to provide a medical emergency crash cart which is ergonomic in nature. It is a further object of the present invention to provide a crash cart which is mobile and provides a high degree of maneuverability.

It is a further object of the present invention to provide a medical emergency treatment cart which has a plurality of stations associated therewith.

In a first aspect of the invention there is provided a medical emergency treatment cart having a generally rectangular configuration with a pair of opposed sides and a pair of opposed ends, the cart comprising first and second modules at opposed ends of the cart, the first module having at least one storage drawer moveable into and out of a storage position, and means for storing an oxygen container, the second module having at least one storage drawer moveable into and out of a storage position, the storage drawer of the second module being mounted so as to be rotatable whereby access to said drawer may be had from a side or an end of said cart, an upper surface of the cart having turntable means for receiving a monitor-defibrillator, the upper surface also having a medicament storage compartment, and a cover moveable into and out of a covering relationship with respect to the medicament storage compartment.

In a further aspect there is provided a medical emergency treatment cart of a generally rectangular configuration comprising a plurality of stations associated therewith, the first of the stations being an airway station having drawer storage means and an oxygen container storage means, a second of the stations being a nursing station having drawer storage means and medicament storage means, the cart having first and second sets of wheels, a first set of the wheels being pivotable through 360° and a second set of the wheels being fixed, and a further wheel assembly having a pivotable wheel associated with an end of the cart adjacent the second set of fixed wheels, the pivotable wheel being moveable into and out of contact with a floor surface such that when the pivotable wheel is in contact with the floor surface, the second set of wheels are raised from contact with the floor surface to thereby provide a three wheeled treatment cart wherein all three wheels are pivotable through 360°.

In greater detail, the medical emergency treatment cart of the present invention has, in its preferred embodiment, a wheel arrangement which permits both maximum speed and maneuverability. In this respect, it will be understood that these crash carts have a substantial weight.

A conventional arrangement provides for two fixed wheels and two pivotable wheels such that it can be turned going around corners and entering rooms. In a preferred aspect of the present invention, there is provided a fifth wheel which can be activated when desired such that the crash cart becomes a three wheeled unit with all three of the wheels being pivotable. This arrangement is highly desirable when operating in close quarters or for precise positioning of the cart.

The cart also includes, in one embodiment, brake means operative on one or more of the wheels to prevent undesired movement. Many different arrangements are possible. In one of such embodiments, there is provided a brake which is in a normally operative position and requires positive disengagement. Conveniently, such a brake may be incorporated in conjunction with a handle whereby movement of the cart would require grasping of the handle and releasing of the brake at the same time. The brake could then function as a safety brake to automatically stop the cart unless pressure is applied continually thereto. In another embodiment,there is provided a standart brake having a releasable locking mechanism.

In a preferred embodiment of the invention, the medical emergency treatment cart is particularly designed for responding to cardiac arrests. As such, the treatment cart is designed to provide a number of "stations" such that the various members of the response team may work in a coherent and unified manner. Typically, the response team will include at least one member to commence resuscitation procedures (manual or electrical), an individual to supply oxygen to the patient, and a third member, frequently a nurse, to prepare medication, take notes and supply all necessary requirements to the doctor.

In this embodiment, the treatment cart will have an upper surface upon which there is mounted means for receiving a monitor-defibrillator and other suitable equipment. In the case of treatment of cardiac arrest, the apparatus for applying an electric shock to the patient frequently comes as a compact unit including a built-in monitor. Accordingly, the treatment cart would include a rotatable turntable upon which a unit could be mounted. The doctor would have access to the unit from all sides of the treatment cart.

A second station could generally be classified as an airway station from where the team member applying the oxygen therapy may operate from. As such, the airway station would preferably include means for storing a supply of oxygen (an oxygen canister) as well as all necessary equipment associated therewith. To this end, the station may allow for access to storage means for the necessary paraphernalia.

A third station could conveniently be referred to as a nursing station. As such, this station would provide for storage means for necessary equipment and medication for responding to emergencies. It would also preferably include a convenient flat surface for taking notes and the like.

In a preferred embodiment, the module associated with the nursing station may provide for access to the storage means from two or more locations. The advantage of providing such an arrangement lies in the fact that frequently the space available for the cart and personnel is somewhat limited. This situation will, for example, arise when the cart is used between beds or the like. If access were provided to the storage for only one position, this could cause problems. A preferred arrangement for overcoming these problems comprises a storage means which is mounted on a turntable - i.e. is rotatable such that access may be had from either side of the treatment cart or from an end.

In addition to the above requirements, the treatment cart may include other features such as waste disposal means, means for holding file folders, chart sheets, medical information, writing surfaces, locks and the like.

Having thus generally described the invention, reference will now be made to the accompanying drawings illustrating an embodiment thereof, in which:

FIG. 7 is an end view of the wheel arrangement on the left hand side of FIG. 1;

FIG. 8 is a sectional view taken along the lines A—A of FIG. 7; and

FIG. 9 is a view similar to FIG. 8 showing the retractable wheel assembly having its wheel in the retracted position; and FIG. 10 is a detail perspective view of a set of wheels part of a treatment cart in accordance with a second embodiment of the invention.

Figure 1:
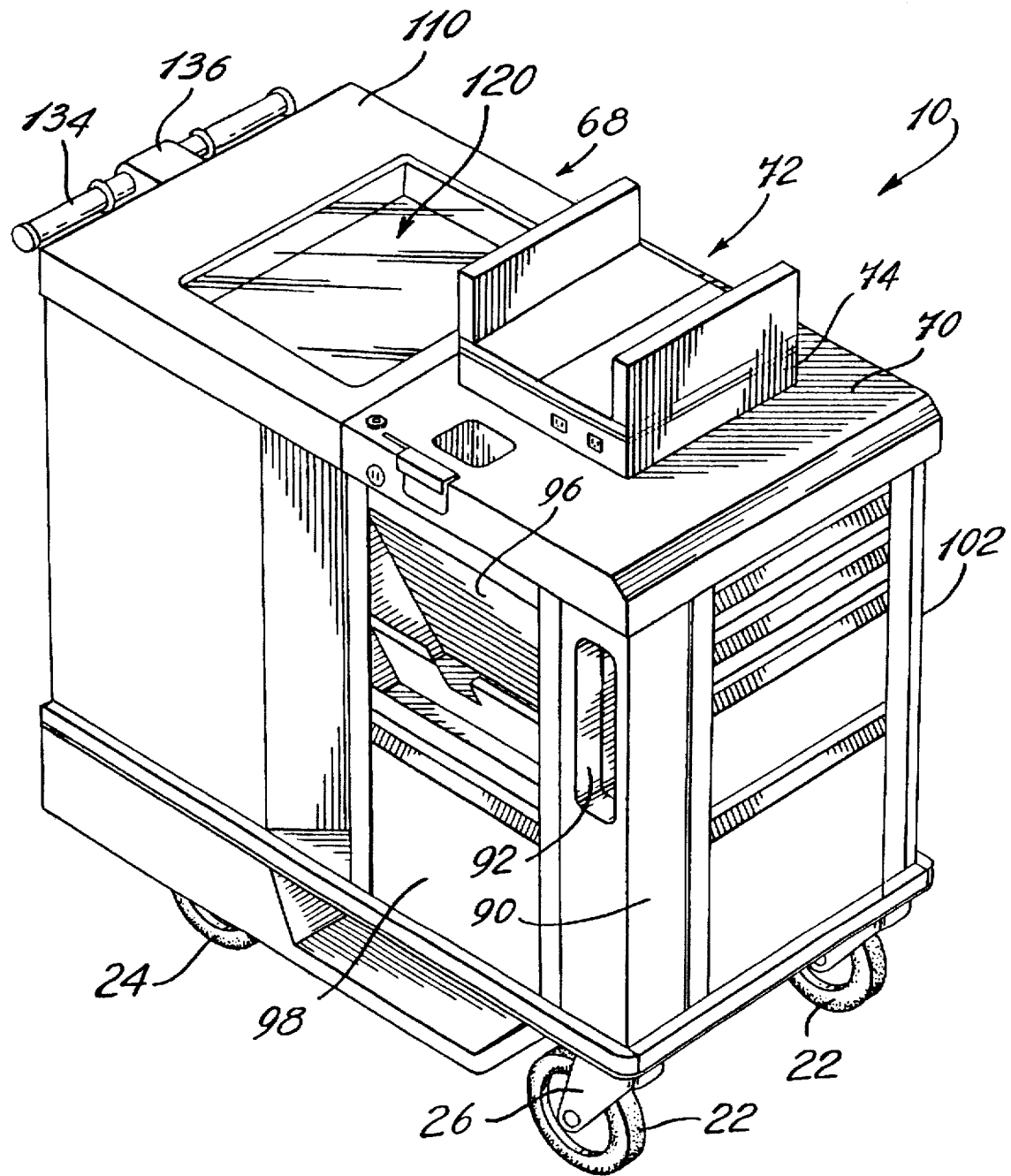
FIG. 1 is a perspective view of a medical emergency treatment cart according to the present invention.

In greater detail, and referring to the drawings by reference characters, there is illustrated in FIG. 1 a medical emergency treatment cart 10 wherein all the components are in the closed position such as would be the case for transporting the cart from one location to another.

Treatment cart 10 is of a generally rectangular configuration having a first end 12 and a second opposed end 14. Similarly, their are a pair of opposed sides 16 and 18. A generally rectangular frame F is provided on which there is mounted a base 20.

Treatment cart 10 is usually required to be moved from one location to the other and accordingly, has a first set of wheels 22 mounted proximate end 12. Wheels 22 are mounted on conventional wheel mounting members 26; the mounting is such that wheels 22 are pivotal or rotatable through 360°.

Located proximate end 14 are a second set of wheels 24 which are suitably journalled in wheel mounting members 28 attached to frame F. Wheels 24 are fixed and are not pivotable as are wheels 22.

There is provided a pivoting wheel assembly 30 mounted intermediate wheels 24. As may be best seen in FIGS. 7, 8 and 9, wheels assembly 30 includes a base member 32 which is pivotably connected at point 34. A wheel 36 is mounted in a wheel mounting member 38 in a pivotable fashion such that wheels 36 can pivot through 360°.

A pedal or activating member generally designated by reference numeral 40 includes an end portion 42 and a pair of arms 44 and 46. Arms 44 and 46 are substantially identical and thus only one will be described herein. Arm 44 is pivotably connected at pivot point 48. A linking arm 50 is connected to arm 44 at pivot point 52 and at its other end is connected to frame F at pivot point 54.

In operation, the treatment cart can be maneuvered using the first set of pivotable wheels 22 for purposes of turning such as will occur going around corners and entering a room. This arrangement provides for maximum maneuverability. However, in situations wherein the cart must be maneuvered quickly into proximity to a bed or a patient, activation of pedal 40 will cause wheel 36 to move from the position shown in FIG. 9 to that shown in FIG. 8. Thus, the triangular linkage will cause base member 32 to pivot about point 34 and thus bring wheel 36 into contact with the floor and slightly raising the cart such that wheels 24 are then inactivated. The cart then becomes a three wheel cart allowing for maximum maneuverability.

A tension spring 50 interconnects frame F and base member 32 to retain wheel 36 in a normally retracted position.

In an alternative embodiment of the invention, the wheels 24 are replaced by wheels 24' that are pivotable through 360° instead of being fixed. In the second embodiment, the wheel 36 is replaced by a locking mechanism 138 that selectively prevents the wheels 24 from pivoting.

FIG. 10 illustrates a wheel 24' rotatably mounted on a wheel mounting members 28' attached to frame F. The wheel mounting members 28' is mounted on the frame F so as to be pivotable relatively to the latter as indicated by arrow 140.

The locking mechanism 138 includes a locking pin 142 extending from the wheel mounting member 28'. A locking brace 144, attached to an activating pedal 146 is pivotally mounted on the frame F so as to pivot between a locked position wherein the brace 144 encircles the locking pin 142 and an unlocked position wherein it allows the wheel mounting member 28' to pivot.

Treatment cart 10 can generally be divided into a first module 66 and a second module 68, each designed for their own specific purposes.

Figure 2:
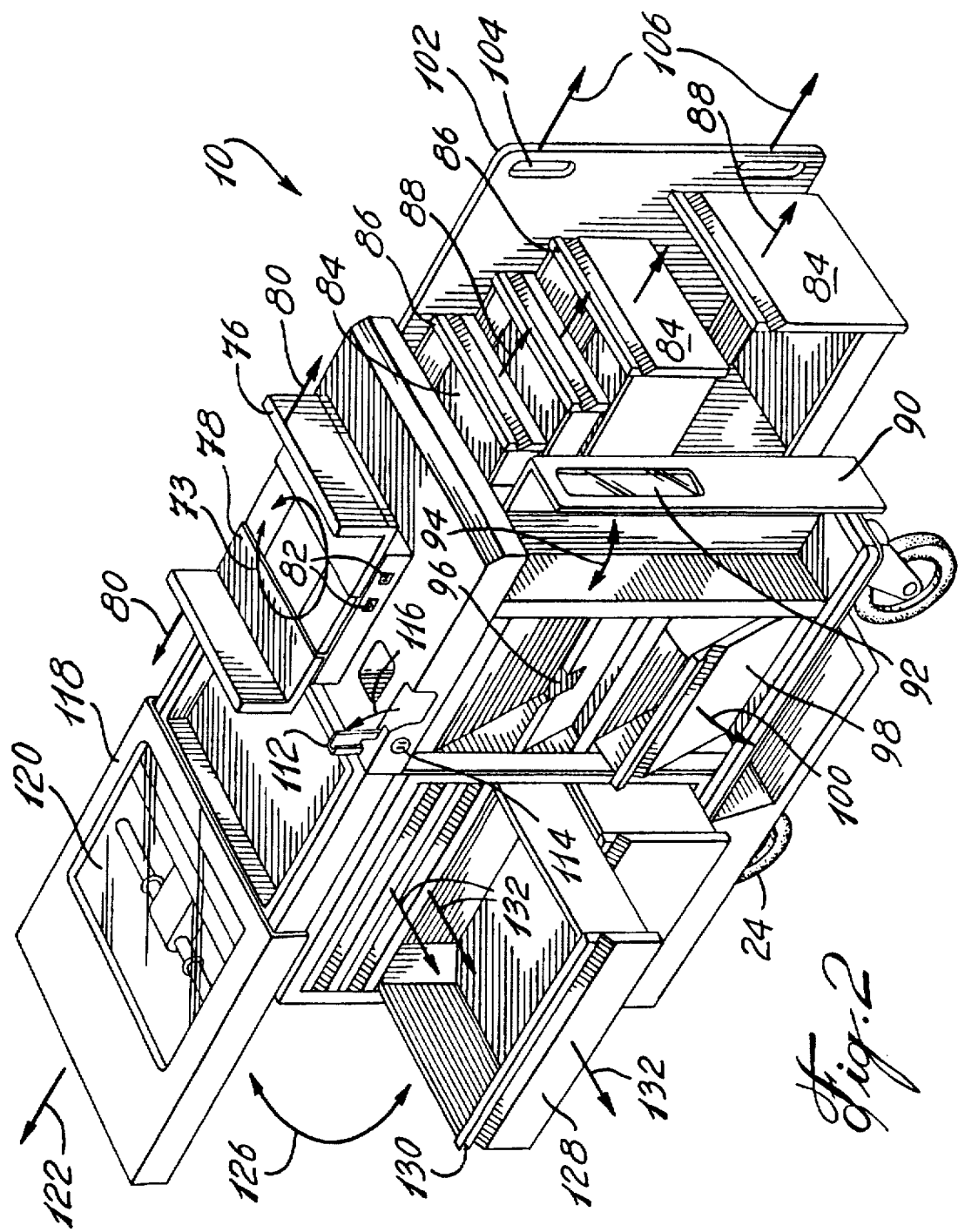
FIG. 2 is a view similar to FIG. 1 illustrating access to the various components of the treatment cart.

First module 66 has, as may be seen in FIGS. 1 and 2, an upper surface 70 upon which there is provided a pivotable platform designated by reference numeral 72. Pivotable platform 72 can rotate as indicated by arrow 73 and includes a base 74. The platform itself comprises a first half platform 76 and a second half platform 78 which are moveable in the directions indicated by arrows 80 away from each other such that the platform may be sized to receive different dimension monitor-defibrillators. Conveniently, electrical outlets 82 may be provided in base 74.

Figure 6:
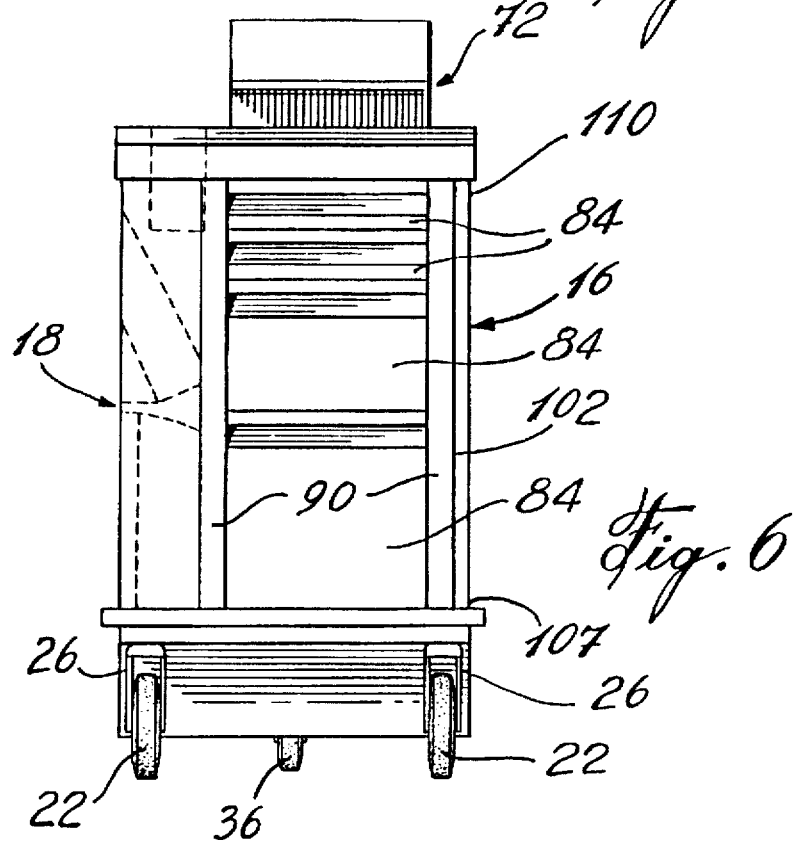
FIG. 6 is the end elevational view as seen from the right hand side of FIG. 1.

Module 66 is provided with a plurality of sliding drawers generally designated by reference numeral 84 and which are located at end 12 of cart 10. Drawers 84 may conveniently be provided with hand grips designated by reference numeral 86; drawers 84 are moveable into and out of a storage position as indicated by arrows 88. As may be best seen in FIG. 6, drawers 84 are mounted in a conventional manner between vertical members 90.

At a corner between end 12 and side 16 there is provided a storage compartment formed by an L-shaped door 91 which has a transparent portion 92 formed therein. Conveniently, the compartment thus formed may be used for storage of an oxygen tank or bottle.

Along side 18, as may be seen in FIGS. 1 and 2, there is provided an upper file holder section generally designated by reference numeral 96 and a waste disposal section 98. As indicated by arrows 100, waste disposal section 98 is pivotably moveable for opening and closing purposes.

On side 16, there is provided a cardiac massage board 108 which has a pair of hand grip apertures 104 formed therein. The cardiac massage board 104 is mounted within a lower U-shaped channel 107 and an upper U-shaped channel 110 such that it may be removed as indicated by arrow 106.

Locking of the various drawers and compartments can be achieved by a conventional locking assembly having a lock 114 which permits or stops operation of handle 112 from moving as indicated by arrow 116. Many such locking arrangements are known and thus need not be described in detail herein.

Module 68 includes a cover 118 having a transparent portion 120. Cover 118 is moveable as indicated by arrow 122 to provide access to an upper storage compartment 121. Preferably transparent portion 120 is formed of a smoked type glass to facilitate visual access to the contents of upper storage compartment 121 when seen at an angle.

Figure 3:
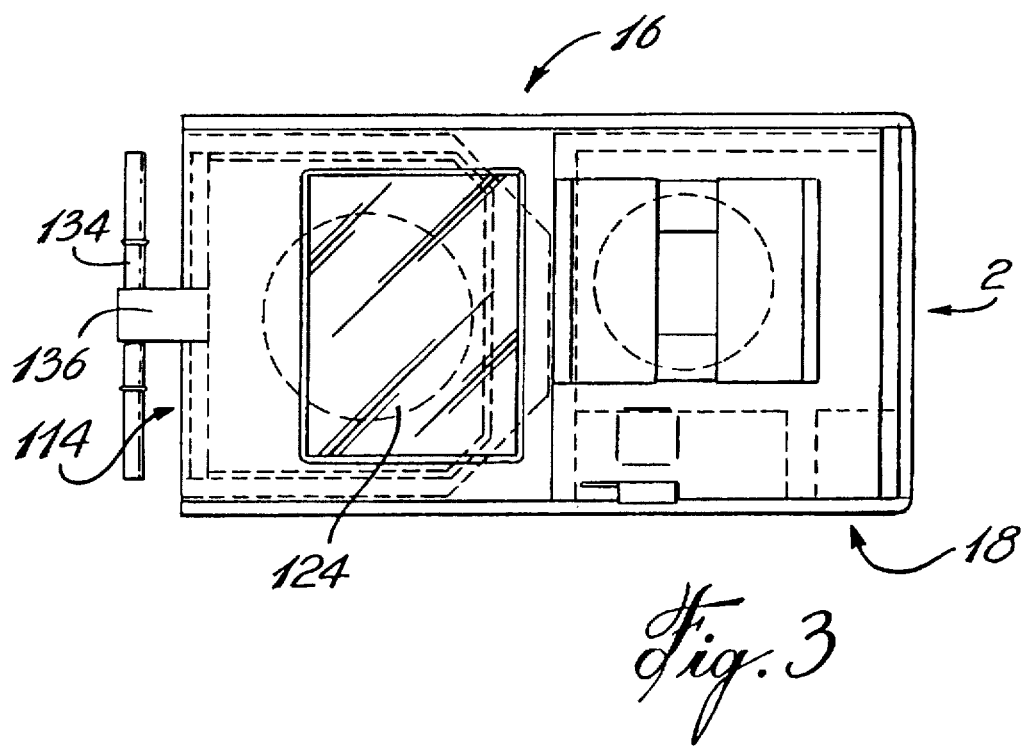
FIG. 3 is a top plan view thereof with hidden portions being shown in dotted lines.
Figure 4:
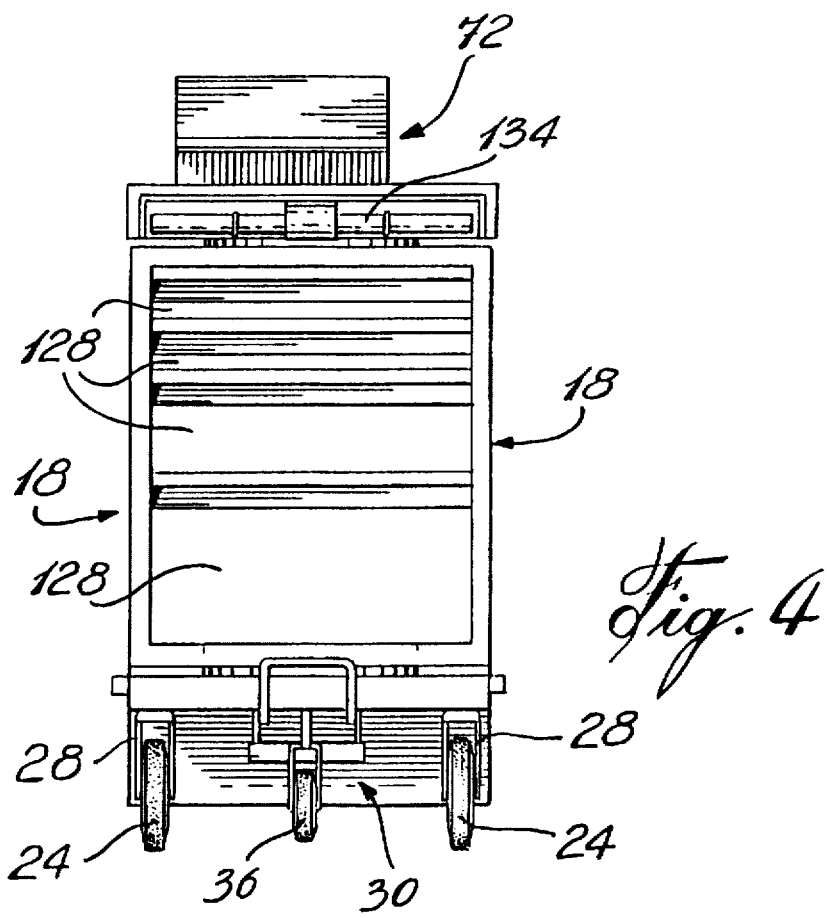
FIG. 4 is an end view as seen from the left hand side of FIG. 1.
Figure 5:
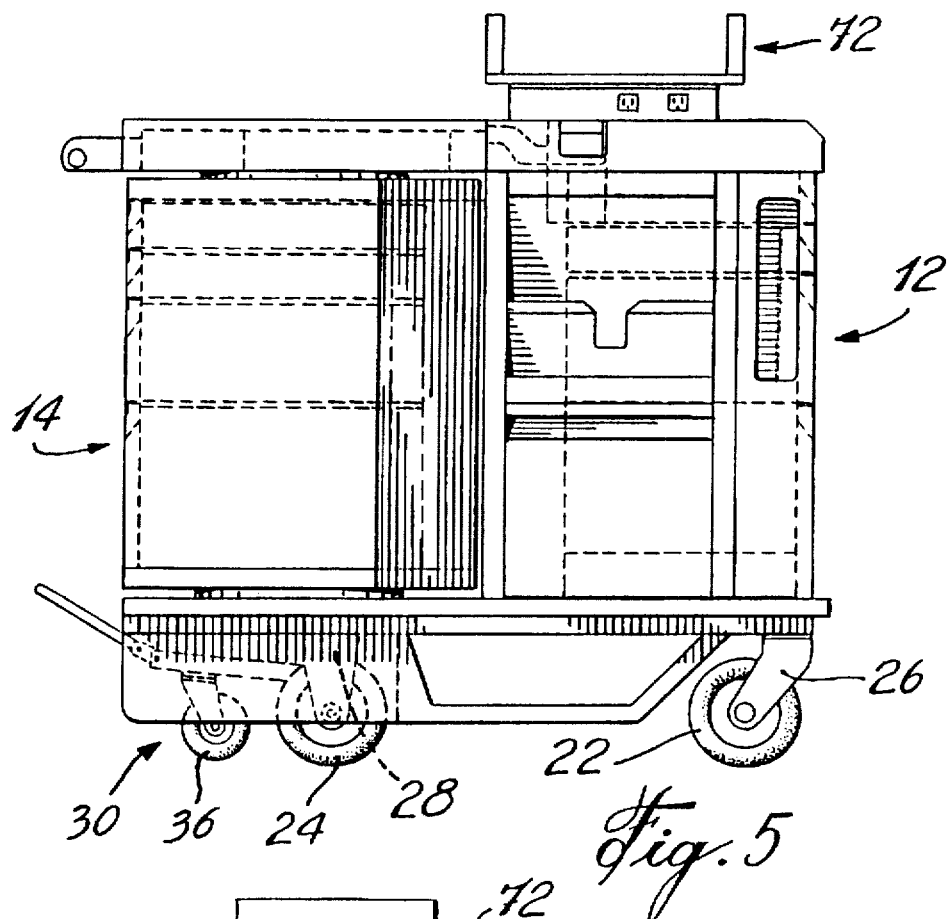
FIG. 5 is a side elevation view of the treatment cart.

As indicated in FIG. 3, module 68 is mounted on a turn table 124, such that it may rotate as indicated by arrow 126. (FIG. 2.)

Module 68 includes at least one and preferably a plurality of drawers 128 having handle grips 130 associated therewith to move as indicated by arrows 132.

The treatment cart has a handle member 134 suitably mounted in a handle mounting element 136.

The above arrangement provides for a medical emergency treatment cart or so called "crash" cart which provides maximum flexibility and utility. In use, the physician would normally be stationed adjacent side 16 with visual access to a monitor-defibrillator mounted in pivot platform 70.

In general terms, module 66 could be classified as an airway station with the appropriate medical requirements being stored in drawers 84 and with access to oxygen by movement of door 90.

Module 68 could be classified, in general terms, as a nursing station. In this respect, as previously described, module 68 is rotatable such that in a normal transportation mode, drawers 128 would open in the direction of second end 14. However, with pivotable movement thereof, they may open on either side 18, as shown in FIG. 2 or on side 16. The sliding movement of cover 118 provides for a working surface while also providing direct access to medicaments stored in upper storage compartment 121.

It will be understood that the above described embodiments are for purposes of illustration only and that changes and modifications may be made thereto without departing from the spirit and scope of the invention.

We claim:

1. A medical emergency treatment cart having a generally rectangular configuration with a pair of opposed sides and a pair of opposed ends, said cart comprising first and second modules at opposed ends of said cart, said first module having at least one storage drawer moveable into and out of a storage position, and means for storing an oxygen container, said second module having at least one storage drawer moveable into and out of a storage position, said storage drawer of said second module being mounted so as to be rotatable whereby access to said drawer may be had from either side or an end of said cart, an upper surface of said cart having turntable means for receiving a monitor-defibrillator, said upper surface also having a medicament storage compartment, and a cover moveable into and out of a covering relationship with respect to said medicament storage compartment.

2. The treatment cart of claim 1 further including locking means associated with said storage drawers of said first module and said storage drawer of said second module.

3. The treatment cart of claim 2 wherein said locking means comprises a single locking means adapted to lock and unlock all of said storage drawers in a single operation.

4. The treatment cart of claim 1 wherein said cart includes first and second sets of wheels, a first set of said wheels being pivotable through 360° and a second set of said wheels being fixed, and a further wheel assembly having a pivotable wheel associated with an end of said cart adjacent said second set of fixed wheels, said pivotable wheel being moveable into and out of contact with a floor surface such that when said pivotable wheel is in contact with said floor surface, said second set of wheels are raised from said floor surface to thereby provide a three wheeled treatment cart wherein all three wheels are pivotable through 360°.

5. The treatment cart of claim 1 wherein said cart has wheels associated therewith, braking means in operative association with at least one of said wheels.

6. The treatment cart of claim 1 wherein said turntable means for receiving a monitor-defibrillator include a turntable surface, said turntable surface being adjustable in width to adapt to different size monitor-defibrillators.

7. The treatment cart of claim 1 further including file holder means adapted to receive and retain one or more file folders.

8. The treatment cart of claim 1 further including a waste disposal receptacle associated with said first module.

9. The treatment cart of claim 1 further including means for retaining a cardiac massage board, said means comprising a pair of opposed U-shaped channels at one side of said treatment cart to receive said cardiac massage board.

10. The treatment cart of claim 1 wherein said cover is moveable into and out of a covering relationship with respect to said medicament storage compartment includes a transparent portion, said transparent portion permitting visual access to said medicament storage compartment.

11. A medical emergency treatment cart of a generally rectangular configuration comprising a plurality of stations associated therewith, the first of said stations being an inhalation station having drawer storage means and an oxygen container storage means, a second of said stations being a nursing station having drawer storage means and medicament storage means, said cart having first and second sets of wheels, a first set of said wheels being pivotable through 360° and a second set of said wheels being fixed, and a further wheel assembly having a pivotable wheel associated with an end of said cart adjacent said second set of fixed wheels, said pivotable wheel being moveable into and out of contact with a floor surface such that when said pivotable wheel is in contact with said floor surface, said second set of wheels are raised from contact with said floor surface to thereby provide a three wheeled treatment cart wherein all three wheels are pivotable through 360°.

12. The treatment cart of claim 11 further including brake means associated with at least one of said first and second sets of wheels.

13. A medical emergency treatment cart having a generally rectangular configuration with a pair of opposed sides and a pair of opposed ends, said cart comprising first and second modules at opposed ends of said cart, said first module having at least one storage drawer moveable into and out of a storage position, and means for storing an oxygen container, said second module having at least one storage drawer moveable into and out of a storage position, said storage drawer of said second module being mounted so as to be rotatable whereby access to said drawer may be had from either side or an end of said cart, an upper surface of said cart having turntable means for receiving a monitor-defibrillator, said upper surface also having a medicament storage compartment, and a cover moveable into and out of a covering relationship with respect to said medicament storage compartment; said cart including first and second sets of wheels, said first and second sets of said wheels being pivotable through 360°; said cart also including a locking mechanism for selectively preventing said second set of wheels from pivoting.

14. The treatment cart of claim 13 wherein each wheel part of said second set of wheels is rotatably mounted on a wheel mounting members attached to said frame; said wheel mounting members being mounted on said frame so as to be pivotable relatively to the latter; said locking mechanism including a locking pin extending from each said wheel mounting members; said locking mechanism also including a locking brace attached to an activating pedal, said locking brace being pivotally mounted on said frame so as to pivot between a locked position wherein said brace encircles said locking pin and an unlocked position wherein it allows said wheel mounting member to pivot.

* * * * *